United States Patent
Li et al.

(10) Patent No.: US 9,160,435 B2
(45) Date of Patent: Oct. 13, 2015

(54) BEAMFORMING BASED ON INFORMATION FROM PLATFORM SENSORS

(75) Inventors: Guoqing Li, Portland, OR (US); Carlos Cordeiro, Portland, OR (US); Bahareh Sadeghi, Portland, OR (US); Ali S. Sadri, San Diego, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 13/993,203

(22) PCT Filed: Dec. 13, 2011

(86) PCT No.: PCT/US2011/064609
§ 371 (c)(1),
(2), (4) Date: May 12, 2014

(87) PCT Pub. No.: WO2013/089679
PCT Pub. Date: Jun. 20, 2013

(65) Prior Publication Data
US 2014/0293870 A1    Oct. 2, 2014

(51) Int. Cl.
*H04B 7/06*    (2006.01)
*H04W 64/00*    (2009.01)

(52) U.S. Cl.
CPC ........... *H04B 7/0617* (2013.01); *H04W 64/006* (2013.01)

(58) Field of Classification Search
None
See application file for complete search history.

(56) References Cited

U.S. PATENT DOCUMENTS

| 2001/0003443 | A1* | 6/2001 | Velazquez et al. ............ 342/367 |
| 2002/0039912 | A1 | 4/2002 | Yamaguchi et al. |
| 2003/0119559 | A1 | 6/2003 | Chitrapu |
| 2005/0202859 | A1 | 9/2005 | Johnson et al. |
| 2006/0073850 | A1 | 4/2006 | Cha et al. |
| 2006/0171357 | A1 | 8/2006 | King et al. |
| 2008/0045235 | A1* | 2/2008 | Kennedy et al. ........... 455/456.1 |
| 2008/0095072 | A1 | 4/2008 | Shao et al. |

(Continued)

FOREIGN PATENT DOCUMENTS

| WO | 2013/089679 A1 | 6/2013 |
| WO | 2013/089681 A1 | 6/2013 |

OTHER PUBLICATIONS

NPL titled "Antenna Beamforming for a 60 GHz Transceiver system", by Khan, Aug. 2009.*

(Continued)

*Primary Examiner* — Thai Nguyen
(74) *Attorney, Agent, or Firm* — Ellis B. Ramirez; Prass LLP

(57) ABSTRACT

A system and method are provided for triggering re-beamforming in a 60 GHz communication link based on information collected from platform positional sensors associated with one or the other or both of the transmitters/receivers that constitute ends of the communication link. The disclosed systems and methods monitor various positional sensors that may be used to sense translational and rotational movement of at least one of the platforms on which at least one of the transmitters/receivers is mounted. Information provided by the positional sensors is processed to determine whether or not to trigger re-beamforming for link recovery in 60 GHz communication link. Information provided by the sensors may be used in combination with other link operating metrics, such as PER and RSSI, to make an intelligent determination whether to trigger re-beamforming.

18 Claims, 2 Drawing Sheets

(56) References Cited

U.S. PATENT DOCUMENTS

| | | | |
|---|---|---|---|
| 2008/0267150 | A1 | 10/2008 | Rofougaran |
| 2010/0172425 | A1 | 7/2010 | Pare, Jr. et al. |
| 2010/0231473 | A1* | 9/2010 | Shtrom et al. ............... 343/757 |
| 2011/0033015 | A1 | 2/2011 | Park et al. |
| 2012/0064841 | A1* | 3/2012 | Husted et al. ................. 455/78 |
| 2014/0016495 | A1 | 1/2014 | Li et al. |

OTHER PUBLICATIONS

International Search Report and Written Opinion received for PCT Patent Application No. PCT/US2011/064631, mailed on Jun. 28, 2012, 9 pages.

Lakshmanan et al., "Practical Beamforming Based on RSSI Measurements Using Off-the-Shelf Wireless Clients", Proceedings of the 9th ACM SIGCOMM conference on Internet measurement conference, Nov. 6, 2009, pp. 410-416.

International Search Report and Written Opinion received for PCT Patent Application No. PCT/US2011/064609, mailed on Jun. 28, 2012, 9 pages.

Mast A.W., "Electronic Antenna Calibration System and Measurements for Compensating Real-Time Dynamic Distortions", 2010 IEEE Aerospace Conference, Mar. 13, 2010, pp. 1-12 (1 page of Abstract only).

International Preliminary Report on Patentability and Written Opinion received for PCT Patent Application No. PCT/US2011/064609, mailed on Jun. 26, 2014, 5 pages.

International Preliminary Report on Patentability and Written Opinion received for PCT Patent Application No. PCT/US2011/064631, mailed on Jun. 26, 2014, 6 pages.

* cited by examiner

BEAMFORMING BASED ON INFORMATION FROM PLATFORM SENSORS

BACKGROUND

This application is related to a co-pending U.S. patent application Ser. No. 13/993,196, filed on the same day as this application, the disclosure of which is incorporated herein in its entirety.

1. Field of the Disclosed Embodiments

This disclosure relates to systems and methods for employing information from platform sensors to trigger re-beamforming for a 60 GHz communication link.

2. Related Art

Before 2000, wireless telecommunication services were generally confined to the range of 2 to 30 GHz. An increasing demand for bandwidth, however, demonstrated the inadequacy of the traditional microwave frequency allocation. The wireless industry, more than a decade ago began to focus on the millimeter wave (MMW) frequency region of the electromagnetic spectrum between 30 GHz and 300 GHz to expand communication capacity. In 2001, the Federal Communications Commission (FCC) set aside a continuous block of 7 GHz of spectrum between 57 and 64 GHz for "unlicensed" wireless communications.

The 60 GHz MMW region of the spectrum became a focus of study based its unique characteristics. Wireless communications in the 60 GHz frequency range experience a high level of atmospheric radio frequency (RF) energy absorption. For many years, the intelligence community had operated wireless systems at 60 GHz because this high level of atmospheric absorption attenuates the transmitted signals over distance, allowing the signals to be very focused. Based on the years of use, the characteristics of this frequency range were well known and well documented. Understanding that the transmitted RE energy in this frequency region would be quickly absorbed by oxygen molecules in the atmosphere over long distances, wireless technology developers began to focus on this characteristic as a benefit for certain applications.

Previously, the high levels of atmospheric absorption and resultant range limitations were viewed as rendering MMW technologies unsuitable for certain wireless applications. As there emerged a need for short-range, focused and potentially secure transmission paths, however, MMW technologies, and particularly 60 GHz MMW systems, were viewed as presenting possible solutions worthy of further study. The unique characteristic of limited energy propagation in an oxygen atmosphere for transmissions in the 60 GHz band was found to present significant benefits such as increased immunity to interference for transmitter/receiver systems in comparatively close proximity to one another leading to a greater degree of potential frequency re-use in a local environment.

Transmitting in the 60 GHz wavelength range results in a fairly focused beam as compared to transmitting in lower frequency ranges. It is this pencil beam transmission capability combined with high energy absorption outside the narrow transmission beam that provides the unique ability to reuse a same frequency in a comparatively localized region making it possible to operate multiple transmitter and receiver combinations on the same frequency in close proximity to one another with very low likelihood of interference.

Another benefit of the use of MMW frequencies lies in the relationship between signal wavelength and antenna size. Transmitters and receivers operating in the MMW region use high-gain antennas to focus as much of the transmitted signal as possible onto the receiving antenna, thereby overcoming the effects of atmospheric absorption in the pencil beam between the transmitter and the receiver. Those of skill in the art recognize that, with an increase in RE frequency, wavelength decreases. This makes it possible to produce required gains with smaller antennas. Thus, at 60 GHz, a very compact, low-cost antenna can be used to achieve a highly focused beam. This architecture results in the emissions from the MMW system via a high-gain/narrow beam antenna being very narrow and focused. Directivity is a measure of how well an antenna focuses its energy in an intended direction. Point-to-point radios should have highly directional antennas in order that all the transmitted energy is directed just at the intended recipient. Highly focused antennas minimize the possibility of interference, minimize the risk that the transmission will be intercepted, and maximize performance. These all were found to be tremendous advantages in the employment of the 60 GHz frequency range for wireless communication.

Against the backdrop of the above advantages, 60 GHz MMW communication suffers from certain shortfalls based on the above-discussed characteristics as well. Among these shortfalls is that 60 GHz communication is, by its very nature, highly susceptible to human blockage. Further, because the 60 GHz transmission beam is so narrowly focused for directional transmission, it is very vulnerable to device movement and rotation. Either of these occurrences can result in significant link degradation. As a result, mechanisms to cope with link degradation due to blockage and/or device movement become of critical importance in sustaining robust 60 GHz communication links.

Among the conventional methods for dealing with link degradation in a 60 GHz link is to employ Modulation Code Scheming (MCS) adaptation using various radio technologies. While adaptation can cope with many issues regarding link degradation, it does not necessarily aid in maintaining optimal link performance in the event of occurrences such as device rotational or translational movement. In these instances, the directional beam of the 60 GHz link may fall completely off the communicating peer device's reception beam. A better strategy for dealing with these occurrences is to perform re-beamforming to find a stronger communication path.

Those of skill in the art recognize that the term "beamforming" refers to a class of well-known signal processing techniques used in certain antenna arrays for manipulating directional signal transmission or reception. One technique is to combine elements in the particular antenna array in a way that signals at particular angles experience constructive interference, while other signals experience destructive interference. Beamforming, therefore, takes advantage of interference to change the directionality of the array. Beamforming can be used at both the transmitting and receiving ends in order to achieve spatial selectivity.

Re-beamforming is a process that can be used to strengthen a weakening communication link, otherwise to re-establish a broken communication link.

SUMMARY OF THE DISCLOSED EMBODIMENTS

An objective of performing re-beamforming in a 60 GHz communication link lies in finding an intelligent triggering mechanism to trigger the re-beamforming quickly, but only at appropriate times. While performing re-beamforming, the data flow along the 60 GHz communication link may have to be completely interrupted. Such an interruption can lead to delay and reduced throughput. Therefore, there exists a tradeoff in developing an intelligent strategy for triggering re-beamforming to cope with link degradation while minimizing the impact on the regular data flow.

In various exemplary embodiments, the systems and methods according to this disclosure may provide an intelligent re-beamforming strategy that meets the objectives of the above tradeoff.

In various exemplary embodiments, the systems and methods according to this disclosure may provide a mechanism to trigger re-beamforming based on information collected from platform sensors.

In various exemplary embodiments, the systems and methods according to this disclosure may take advantage of transmitting/receiving platforms of the communication link being equipped with various sensors that may be used to sense translational and rotational movement of the at least one of the platforms and use information provided by the sensors to trigger re-beamforming for link recovery in 60 GHz link.

In various exemplary embodiments, the systems and methods according to this disclosure may query the sensors to obtain movement, location and/or rotation information.

In various exemplary embodiments, systems method according to this disclosure may initiate the query on a periodically recurring basis, as a single request, or in response to some triggering event.

In various exemplary embodiments, the systems and methods according to the disclosure may include a sensor being physically located on a platform that includes the 60 GHz transmitting/receiving device. It should be noted, however, that the disclosed architecture may be employed across a pair of devices in wireless communication with one another. In such implementations, the systems and methods according to this disclosure may cause one device to communicate sensor data to a peer device in order that the peer device may determine whether to trigger re-beamforming. In this regard, the sensor data may not only be used within one or the other of the transmitting/receiving devices that comprise the communication link, or on platforms that mount one or the other of the transmitting/receiving devices. Rather, the sensor data may be used across a network.

These and other features, and advantages, of the disclosed systems and methods are described in, or apparent from, the following detailed description of various exemplary embodiments.

BRIEF DESCRIPTION OF THE DRAWINGS

Various exemplary embodiments of the disclosed systems and methods for employing information from platform sensors to trigger re-beamforming for a 60 GHz communication link will be described, in detail, with reference to the following drawings, in which.

DETAILED DESCRIPTION OF THE DISCLOSED EMBODIMENTS

The systems and methods for employing information from platform sensors to trigger re-beamforming for a 60 GHz communication link will generally refer to this specific utility for those systems and methods. Exemplary embodiments described and depicted in this disclosure should not be interpreted as being specifically limited to any particular configuration, or directed to any particular intended use. In fact, any re-beamforming strategy for maintaining a wireless communication link traversing a pencil beam between cooperating communication devices, i.e., transmitter/receivers, or for otherwise intelligently triggering re-beamforming using information obtained from sensors that measure movement of a device or platform is contemplated.

Specific reference to, for example, any particular communication device, including specifically cooperating wireless communicating devices operating in the 60 GHz frequency range, should be understood as being exemplary only, and not limiting, in any manner, to any particular class of devices. The systems and methods according to this disclosure will be described as being particularly adaptable the above-described function, but should not be considered as being limited to only these functions.

Individual features and advantages of the disclosed systems and methods will be set forth in the description that follows, and will be, in part, obvious from the description, or may be learned by practice of the features described in this disclosure. The features and advantages of the systems and methods according to this disclosure may be realized and Obtained by means of the individual elements and method steps, and combinations of those elements and method steps, as particularly pointed out in the appended claims. While specific implementations are discussed, it should be understood that this is done for illustration purposes only. A person skilled in the relevant art will recognize that other components and configurations may he used without departing from the spirit and scope of the subject matter of this disclosure.

Various aspects of the disclosed embodiments relate to a system and a method for employing information from platform sensors to trigger re-beamforming for a 60 GHz communication link, as well as a corresponding non-transitory computer-readable medium having recorded on it a program that, when executed by a processor, causes the processor to execute the steps of the method for employing information from platform sensors to trigger re beamforming for a 60 GHz communication link.

Figure 1:
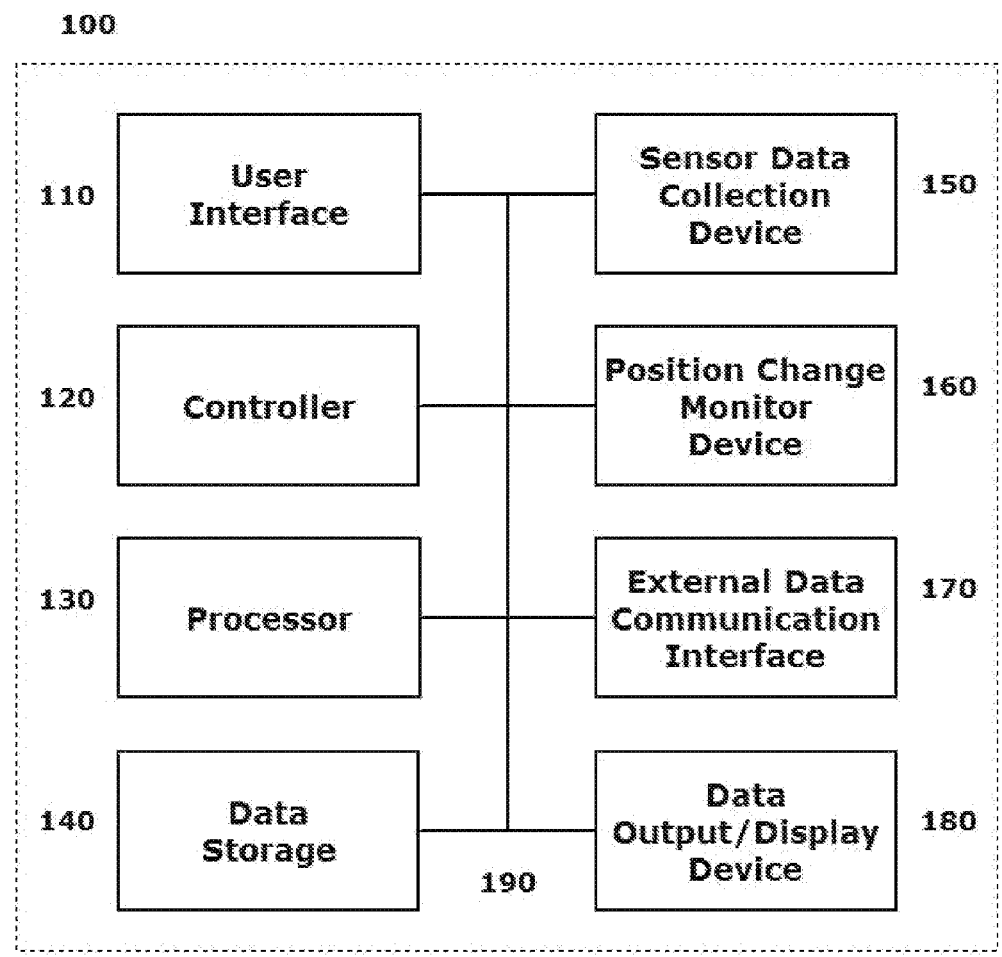
FIG. 1 illustrates a block diagram of an exemplary system for employing information from platform sensors to trigger re-beamforming for a 60 GHz communication link, according to this disclosure.

FIG. 1 illustrates a block diagram of an exemplary system 100 for employing information from platform sensors to trigger re-beamforming for a 60 GHz communication link according to this disclosure. The exemplary system 100 may be in either of a transmitter or a receiver, or both, in a 60 GHz communication link. Otherwise, the system 100 may be remotely located and simply communication with the sensors in the transmitter and/or receiver, or with sensors that are separately mounted on a platform on which the transmitter and/or receiver are mounted, or otherwise, to sense movement of the transmitter and/or receiver or their mounting platforms.

The system 100 may include a user interface 110 by which a user can communicate with the system 100. The user interface 110 may be configured as any one or more conventional mechanisms that permit a user to input information to the system 100. The user interface 110 may include, for example, an integral or attached keyboard and/mouse, or a touchscreen with "soft" buttons. The user interface 110 may alternatively include a microphone by which a user may provide oral commands to the system 100 to be "translated" by a voice recognition program or otherwise. The user interface 110 may otherwise include any other like device for user operation of, and data exchange with, the system 100.

The user interface 110 may provide a user of the system 100 an opportunity to activate the system 100 and also to manually enter, to set or to reset certain movement thresholds to be compared to sensor information to determine a likelihood of link degradation, as will be discussed in greater detail below.

The system 100 may include a controller 120 for controlling operation of the system 100, and one or more local processors 130 for individually undertaking determination processes that are carried out by the system 100. The controller 120 and the processor(s) 130 may cooperate to carry out the processing and control functions for employing information from platform sensors to make a determination as to whether to trigger re-beamforming fir a 60 GHz communication link of which the system 100 is a part based on that sensor information. Processor(s) 130 may include at least one conventional processor or microprocessor that interprets and implements instructions to make the determinations according to the exemplary method of this disclosure discussed below.

The system 100 may include one or more data storage devices 140. Such data storage device(s) 140 may be used to store data or operating programs to be used by the system 100, and specifically the controller 120 and the processor 130. Data storage device(s) 140 may include a random access memory (RAM) or another type of dynamic storage device that stores information and instructions for execution by the controller 120 and the processor(s) 130. Data storage device(s) 140 may also include a read-only memory (ROM), which may include a conventional ROM device or another type of static storage device that stores static information and instructions for the controller 120 and the processor(s) 130. The data storage device(s) 140 may be provided as integral components of the system 100 or otherwise may be provided external to, and in wired or wireless communication with, the system 100.

At least one data storage device 140 may he configured to store, in the system 100, predetermined thresholds for acceptable/unacceptable rotational and translational movement of one or the other of the transmitter/receiver devices that comprise the communication link.

The system 100 may include at least one sensor data collection device 150. The sensor data collection device 150 may be capable of collecting data from one or more platform sensors with which the sensor data collection device 150 may he in wired or wireless communication via, for example, one or more external data communication devices 170. The sensor data collection device 150 may monitor one or more position sensors associated with one or more platforms on which the transmitters/receivers making up either end of the communication link may be mounted. The position sensors may he of any type such as, for example, an inertial Reference Unit (IRU) that can be mounted in a transmitter/receiver, or on a platform on which the transmitter/receiver is mounted, to sense rotational and translational movement of the transmitter/receiver, or the platform.

The system 100 may also include a position change monitor device 160. The position change monitor device 160 may be a standalone component of the system 100, or otherwise, the functions of a position change monitor device 160 may be undertaken by the processor 130 of the system 100. Regardless of the precise structural composition of the position change monitor device 160, it is this device that may initiate a sensor inquiry via the sensor data collection device 150 to assess movement information provided by a monitored sensor or sensors with an objective of using the sensed movement information to intelligently determine whether to trigger re-beamforming in the communication link with the system 100 based on the assessed movement information.

The position change monitor device 160 may initiate periodic inquiries of sensor information via the sensor data collection device 150 according to some recurring period that may be configurable via, for example, user input through the user interface 110.

The position change monitor device 160 may separately, or additionally, initiate inquiries of sensor information based on the system 100 monitoring certain other characteristics of the communication link. For example, if a transmitter/receiver monitored Packet Error Rate (PER) or some other quality characteristic of the communication link, and the monitoring revealed that the communication link has begun degrading, the position change monitor device 160 may initiate an inquiry for sensor information via the sensor data collection device 150 according to a level of link degradation determined by monitoring PER or the other link quality characteristic.

The position change monitor device 160 may separately, or additionally, initiate an inquiry of sensor information based on some sensed parameter reported to the sensor data collection device 150 by one or more of the sensors executing its own algorithm. The sensor may process its own movement. The sensor may determine that a rotation angle of one or the other of the platforms, or translational movement of one or the other of the platforms, exceeds a specified threshold as determined by the sensor, i.e., 20 degrees of rotational movement or 1 meter of translational movement. The sensor may then send information to the sensor data collection device 150 that may cause the position change monitor device 160 to initiate a further inquiry. The parameters are, of course, selectable, and fully adjustable.

The position change monitor device 160 may provide information to the processor 130 in order that the processor 130 may determine whether re-beamforming should be triggered based on sensor-detected physical movement of one or the other of the transmitters/receivers. In all instances, when a threshold for rotational and/or translational movement is exceeded, thereby affecting the communication link, the position change monitor device 160 may provide information to the processor 130 such that the processor 130 will initiate re-beamforming in the communication link. The processor 130 may separately take into account other measurable parameters of the communication link, such as a Received Signal Strength Indication (RSSI) or Packet Error Rate (PER) or other like parameter in order to ultimately determine whether to send a signal from the system 100 to trigger re-beamforming.

The system 100 may include one or more external data communication interfaces 170 by which the system may communicate with and/or monitor the communication link and the sensors associated with the communication link. External data communication interface(s) 170 may include any mechanism that facilitates direct communication, or communication via a network environment, for collection of the above-described data, and sharing of results of processing undertaken by the system 100. External data communication interface(s) 170 may provide wired or wireless connectivity to the communication links that are being monitored. This provides an option for the system 100 to be internally mounted as an integral component of either of the transmitter or receiver that make up the communication link, or to be a separate standalone component in communication with one or both of the transmitter and receiver that make up the communication link. One of the external data communication interface(s) 170 may be configured specifically to detect and report sensor data to the sensor data monitoring device 150 of the system 100.

The system 100 may include at least one data output/display device 180 which may be configured as one or more conventional mechanisms that display information to the user of the system 100 for alerting the user, for example, to a triggering of re-beamforming in the communication link. The data output/display device 180 may also provide a connection by which the system 100 outputs a signal to the communication link to trigger re-beamforming in the communication link based on information received from the one or more sensors via the sensor data monitoring device 150, as processed by the processor, of the system 100.

All of the various components of the system 100, as depicted in FIG. 1, may be connected by one or more data/control busses 190. The data/control busse(s) 190 provide internal wired or wireless communication between the various components of the system 100, whether all of those components are housed integrally as a single unit or are otherwise connected to and in communication with each other.

It should be appreciated that, although depicted in FIG. 1 as an integral unit, the various disclosed elements of the system 100 may be arranged in any combination of sub-systems as individual components or combinations of components, integral to a single unit, or external to, and in wired or wireless communication with the single unit. In other words, no specific configuration as an integral unit or as a support unit, for the system 100 is to be implied by the depiction in FIG. 1. Further, as noted above, the system 100 may be housed integrally within one or both ends of the communication link that the system 100 is intended to monitor and control for re-beamforming.

The disclosed embodiments may include a method for employing information from platform sensors to trigger re-beamforming for a 60 GHz communication link. The method may include establishing one or more thresholds for rotational or translational movement of one or more of the transmitting/receiving platforms in the communication link. The method may monitor sensors that sense at least one of translational or rotational movement of the one or more of the transmitting/receiving platforms in the communication link. The method may then initiate an inquiry regarding the sensed at least one of translational and rotational movement of the one or more of the transmitting/receiving platforms in the communication link. The method may then compare the sensed movement to the thresholds to determine whether the sensed movement exceeds one or more of the thresholds. In instances where the sensed movement exceeds one or more of the thresholds, the method may trigger re-beamforming in the communication link. It may be possible further to confirm the need to trigger re-beamforming by sensing other parameters of the communication link such as, for example, RSSI, PER or some other link quality parameter. Using the above methods, or otherwise, the method may determine whether the thresholds are set correctly. In instances where the thresholds are found not to be set correctly, i.e. to aggressively in maintaining the communication link at the expense of interrupting data flow, or too conservatively in failing to maintain the communication link thereby affecting data flow, the method may modify one or more of the thresholds for rotational and translational movement of the platform of the one or more of the transmitting/receiving devices in the communication link. An objective of properly setting the thresholds is to attempt balance an intelligent strategy for triggering re-beamforming to cope with link degradation quickly while minimizing interruptions to regular data flow across the communication link.

Figure 2:
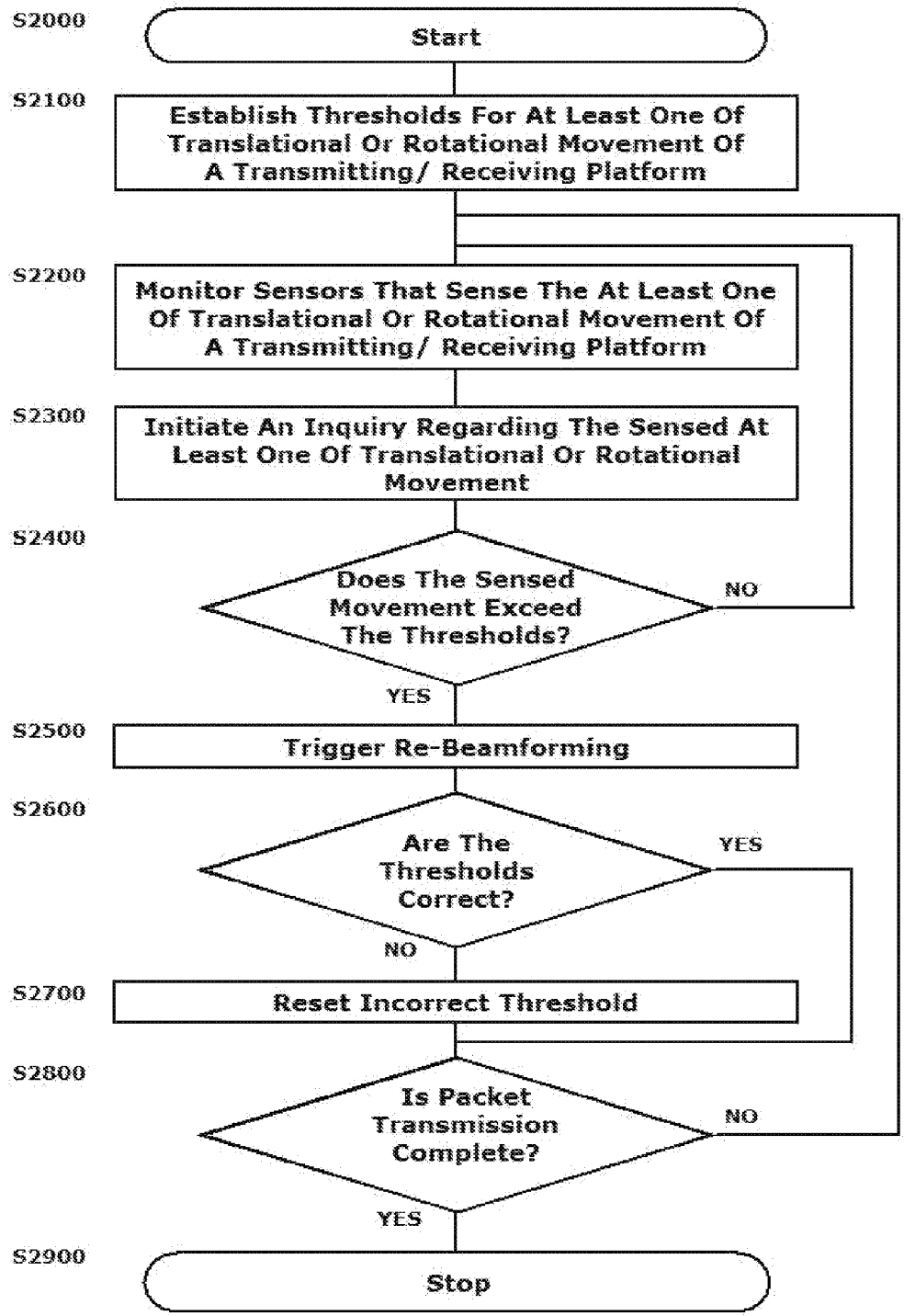
FIG. 2 illustrates a flowchart of an exemplary method for employing information from platform sensors to trigger re-beamforming for a 60 GHz communication link according to this disclosure.

FIG. 2 illustrates a flowchart of an exemplary method for employing information from platform sensors to trigger re-beamforming for a 60 GHz communication link according to this disclosure. As shown in FIG. 2, operation of the method commences at Step S2000 and proceeds to Step S2100.

In Step S2100, thresholds are established for at least one of translational and rotational movement of the transmitting/receiving platform. The establishing of these thresholds may comprise establishing a pre-determined threshold and storing it in a data storage device of a monitoring system. The establishing of the thresholds may be otherwise based on some manual input from a user, or an automated input from the monitoring system based on observed or monitored characteristics of the communication link. Operation of the method proceeds to Step S2200.

In Step S2200, sensors that sense rotational or translational movement of one or more of the transmitter/receiver platforms in the communications link are monitored, for example, by a sensor monitor device. Operation of the method proceeds to Step S2300.

In Step S2300, an inquiry regarding at least one of a sense rotational and/or translational movement of one or more of the transmitter/receiver platforms in the communication link is made. This inquiry may be based on a passage of an elapsed time in the case of periodic inquiry. If periodic inquiry is employed, the elapsed time parameter may be user or machine adjustable. The inquiry may also be based on a request from one or the other of the transmitter or receiver. In such an instance, the transmitter and/or receiver may monitor, for example, RSSI, PER or other link quality parameter to determine if the link is degrading, in instances where it is determined that the link is degrading, the method may initiate an inquiry regarding the extent of translational or rotational movement that has been undertaken. Finally, an inquiry may be initiated based on preset parameter for translational or rotational movement, which may be stored, for example in the sensor. In such an instance, when it is determined that the translational rotational movement exceeds a preset parameter, and inquiry of sensed translational or rotational movement may be initiated. Operation of the method proceeds to Step S2400.

Step S2400 is a determination step. In step 2400, it is determined whether the sensed movement exceeds one or more of the established thresholds for translational or rotational movement. If in Step S2400, it is determined that the sensed movement does not exceed one or more of the established thresholds for translational or rotational movement, operation of the method may revert to Step S2200 for additional monitoring, or operation of the method may proceed to Step S2800 as discussed below.

If, in Step S2400, it is determined it is determined that the sensed movement exceeds one or more of the established thresholds for translational or rotational movement, operation of the method proceeds to S2500.

In Step S2500, the method may trigger re-beamforming to enable intelligent re-beamforming for the monitored communication link based solely on the sensor movement data. It should be noted that rarely will it be considered prudent to trigger re-beamforming based solely on the sensor movement data. As such, when a particular movement threshold is exceeded, additional link status indicators such as RSSI, PER, or the like may be taken into account before re-beamforming is triggered. Operation of the method proceeds to Step S2600.

Step S2600 is a determination step. In Step S2600, the method may determine whether either the established movement thresholds are chosen properly, i.e. are correct. If in Step S2600, it is determined that the established movement thresholds are correct, operation of the method proceeds to Step S2800.

If, in Step S2600, it is determined that either of the established movement thresholds for translational or rotational movement are not correct, operation of the method proceeds to Step S2700.

In Step S2700, one or both of the established thresholds for translational or rotational movement may be changed. An objective of such a change would be to maintain a robust communication link without unnecessarily interrupting data flow via the communication link. Monitoring other link characteristics/metrics, including RSSI and PER may aid in a determination as to whether the thresholds should be modified. Operation of the method proceeds to Step S2800.

Step S2800 is a determination step. In Step S2800, the method may determine whether the packet transmission across the communication link is complete. If in Step S2800, it is determined that the packet transmission is not complete, operation of the method may revert to Step S2200.

If, in Step S2800, it is determined that the packet transmission is complete, operation of the method proceeds to step S2900 where operation of the method ceases.

The disclosed embodiments may include a non-transitory computer-readable medium storing instructions which, when executed by a processor, may cause the processor to execute the steps of the method outlined above.

The above-described exemplary systems and methods reference certain conventional computing and signal monitoring components to provide a brief, general description of a suitable communication and processing environment in which the subject matter of this disclosure may be implemented for familiarity and ease of understanding. Although not required, embodiments of the disclosure may be provided, at least in part, in a form of hardware circuits, firmware or software computer-executable instructions to carry out the specific functions described, such as program modules, being executed by a processor. Generally, program modules include routine programs, objects, components, data structures, and the like that perform particular tasks or implement particular data types.

Those skilled in the art will appreciate that other embodiments of the invention may be practiced in communication network environments with many types of communication equipment and computer system configurations, particularly in hand-held wireless devices, multi-processor systems, microprocessor-based or programmable consumer electronics, and the like.

Embodiments may also be practiced in distributed network communication environments where tasks are performed by local and remote processing devices, generally as outlined above, that are linked to each other by hardwired links, wireless links, or a combination of both through a communication network. In a distributed network environment, program modules may be located in both local and remote data storage devices.

Embodiments within the scope of the present disclosure may also include computer-readable media having stored computer-executable instructions or data structures that can be accessed, read and executed by an appropriate processor. Such computer-readable media can be any available media that can be accessed by the processor in, or in communication with, the monitored communication link. By way of example, and not limitation, such computer-readable media can comprise RAM, ROM, EEPROM, CD-ROM, flash drives, data memory cards or other analog or digital data storage device that can be used to carry or store desired program elements or steps in the form of accessible computer-executable instructions or data structures. When information is transferred or provided over a network or another communications connection the receiving processor properly views the connection as a computer-readable medium. Thus, any such connection is properly termed a computer-readable medium. Combinations of the above should also be included within the scope of the computer-readable media for the purposes of this disclosure.

Computer-executable instructions include, for example, non-transitory instructions and data that can be executed and accessed respectively to cause a processor to perform certain of the above-specified functions, individually, or in combination. Computer-executable instructions also include program modules that are remotely stored for access by a processor to be executed by the processor when the processor is caused to communicate in a network environment. The exemplary depicted sequence of executable instructions or associated data structures represents one example of a corresponding sequence of acts for implementing the functions described in the steps. The steps of the exemplary methods, as depicted, are not intended to imply any particular order to the depicted steps except as may be necessarily inferred when one of the depicted steps is a necessary precedential condition to accomplishing another of the depicted steps.

Although the above description may contain specific details, they should not be construed as limiting the claims in any way. Other configurations of the described embodiments of the disclosed systems and methods are part of the scope of this disclosure. Accordingly, the appended claims and their legal equivalents should only define the disclosure, rather than any specific examples given.

We claim:

1. A method for triggering beamforming, comprising:
   establishing one or more thresholds for rotational or translational movement of one or more transmitting or receiving devices in a communication link;
   wherein the communication link comprises at least one transmitter and receiver operating in the millimeter wave (MMW) region utilizing high-gain antennas to focus as much of the transmitted signal as possible onto the receiving antenna;
   wherein the communication link is a 60 GHz communication link;
   monitoring at least one positional sensor physically located in at least one of a transmitting device and a receiving device of the communication link;
   monitoring link status of the communication link;
   determining, with a processor, whether movement of the at least one of the transmitting device and the receiving device sensed by the at least one positional sensor exceeds an established one or more thresholds for rotational or translational movement; and
   triggering beamforming when a movement threshold is exceeded and confirmed by the link status being degraded.

2. The method of claim 1, wherein the threshold is predetermined.

3. The method of claim 1, wherein:
   the movement is at least one of translational movement and rotational movement, and
   the threshold is at least a first threshold for translational movement and a second threshold for rotational movement of the at least one of the transmitting and receiving device.

4. The method of claim 1, further comprising ordering, by the processor, an inquiry sent to the at least one positional sensor to transmit information regarding the movement of the at least one of the transmitting device and the receiving device prior to the determining.

5. The method of claim 4, wherein the processor orders the inquiry sent periodically based on an elapsed time.

6. The method of claim 5, wherein the elapsed time between periodic ordering of the inquiry is adjustable.

7. The method of claim 4, wherein monitoring link status is monitoring a characteristic of the communication link, wherein the processor orders the inquiry sent when the monitored characteristic of the communication link indicates link degradation.

8. The method of claim 7, wherein the monitored characteristic of the communication link is one of a received signal strength indication and a packet error rate.

9. The method of claim 4, wherein the processor orders the inquiry sent based on a signal from the at least one sensor that the movement of the at least one of the transmitting device and the receiving device has exceeded a threshold for the movement, the threshold being one of stored in the sensor and generated by an algorithm executed by the sensor.

10. The method of claim 1, further comprising:
monitoring a characteristic of the communication link; and
evaluating the monitored link characteristic to determine whether the communication link is degrading,
wherein the processor triggers the beamforming when the movement of the at least one of the transmitting device and the receiving device exceeds the threshold for the movement, and when the evaluating of the monitored communication link characteristic determines that the communication link is degrading.

11. The method of claim 10, wherein the monitored characteristic of the communication link is one of a received signal strength indication and a packet error rate.

12. A system for triggering beamforming, comprising:
a sensor monitor device that monitors at least one positional sensor physically located in at least one of a transmitting device and a receiving device of a communication link;
wherein the communication link comprises at least one transmitter and receiver operating in the millimeter wave (MMW) region utilizing high-gain antennas to focus as much of the transmitted signal as possible onto the receiving antenna;
wherein the communication link is a 60 GHz communication link;
a position change monitor device that calculates a change in movement of the at least one of the transmitting device and the receiving device based on inputs from the at least one positional sensor;
a processor that is programmed to evaluate whether the change in movement of the at least one of the transmitting device and the receiving device exceeds a threshold for the change in movement, and to determine whether to trigger beamforming is needed by:
establishing one or more thresholds for rotational or translational movement of one or more transmitting or receiving devices in the communication link,
monitoring link status of the communication link,
triggering beamforming when a movement threshold is exceeded and confirmed by the link status being degraded,
a data output device that outputs a signal to trigger the beamforming in the communication link when the processor determines that the beamforming is needed.

13. The system of claim 12, further comprising at least one data storage device,
wherein:
the movement is at least one of translational movement and rotational movement,
the threshold is at least one of a first threshold for translational movement and a second threshold for rotational movement of the at least one of the transmitting device and the receiving device, and
the threshold is stored in the at least one storage device.

14. The system of claim 13, wherein:
the threshold is adjustable, and
the processor is further programmed to adjust the threshold automatically based on at least one of an evaluation of characteristics of the individual communication link and a manual input from a user via a user interface.

15. The system of claim 12, wherein the processor is further programmed to order an inquiry sent to the at least one positional sensor to transmit information on the movement of the at least one of the transmitting device and the receiving device prior to the evaluating and the determining, the inquiry being sent based on at least one of:
an elapsed time period expiring, the elapsed time period recurring periodically,
a monitored characteristic of the communication link indicating link degradation, and
a signal from the at least one sensor indicating that movement of the at least one of the transmitting device and the receiving device has exceeded a threshold for the movement, the threshold being one of stored in the sensor and generated by an algorithm executed by the sensor.

16. The system of claim 12, wherein the processor is further programmed to:
monitor a characteristic of the communication link,
evaluate the monitored link characteristic to determine whether the communication link is degrading, and
trigger the beamforming when the movement of the at least one of the transmitting device and the receiving device exceeds the threshold for the movement, and the evaluating of the monitored link characteristic determines that the communication link is degrading.

17. The system of claim 16, wherein the monitored characteristic of the communication link is one of a received signal strength indication and a packet error rate.

18. A non-transitory computer-readable medium storing computer-readable instructions which, when executed by a processor, cause the processor to execute the method of claim 1.

* * * * *